United States Patent
Serkh

[11] Patent Number: 5,938,552
[45] Date of Patent: Aug. 17, 1999

[54] TENSIONER WITH DAMPING SHOE ACTIVATED BY COMPRESSION SPRING

[75] Inventor: Alexander Serkh, Farmington Hills, Mich.

[73] Assignee: The Gates Corporation, Denver, Colo.

[21] Appl. No.: 09/088,966

[22] Filed: Jun. 2, 1998

[51] Int. Cl.⁶ ...................................................... F16H 7/12
[52] U.S. Cl. ............................................ 474/135; 474/117
[58] Field of Search ................................... 474/133, 135, 474/138, 117, 113, 101, 109–110

[56] References Cited

U.S. PATENT DOCUMENTS

| | | |
|---|---|---|
| 4,883,446 | 11/1989 | Mitchell et al. .......................... 474/133 |
| 4,983,146 | 1/1991 | Charles et al. ............................ 474/117 |
| 5,045,029 | 9/1991 | Dec et al. .............................. 474/135 X |
| 5,045,031 | 9/1991 | Thomey . |
| 5,073,148 | 12/1991 | Dec ...................................... 474/135 X |
| 5,098,347 | 3/1992 | Sajczvk et al. . |
| 5,591,094 | 1/1997 | Farmer et al. . |
| 5,632,697 | 5/1997 | Serkh . |

Primary Examiner—Tamara L. Graysay
Assistant Examiner—Marcus Charles
Attorney, Agent, or Firm—H. W. Oberg, Esq.; C. H. Castleman, Esq.; S. G. Austin, Esq.

[57] ABSTRACT

A tensioner with a base, a pivot-arm that oscillates about a pivot secured to the base, a pulley attached to the pivot-arm, a compression spring with a first end operatively connected to the pivot-arm and a second end operatively connected to a shoe that presses a convex surface of the shoe against a concave arcuate surface of the pivot-arm, to the shoe held in place against a protuberance secured to the base by a balance of forces.

6 Claims, 2 Drawing Sheets

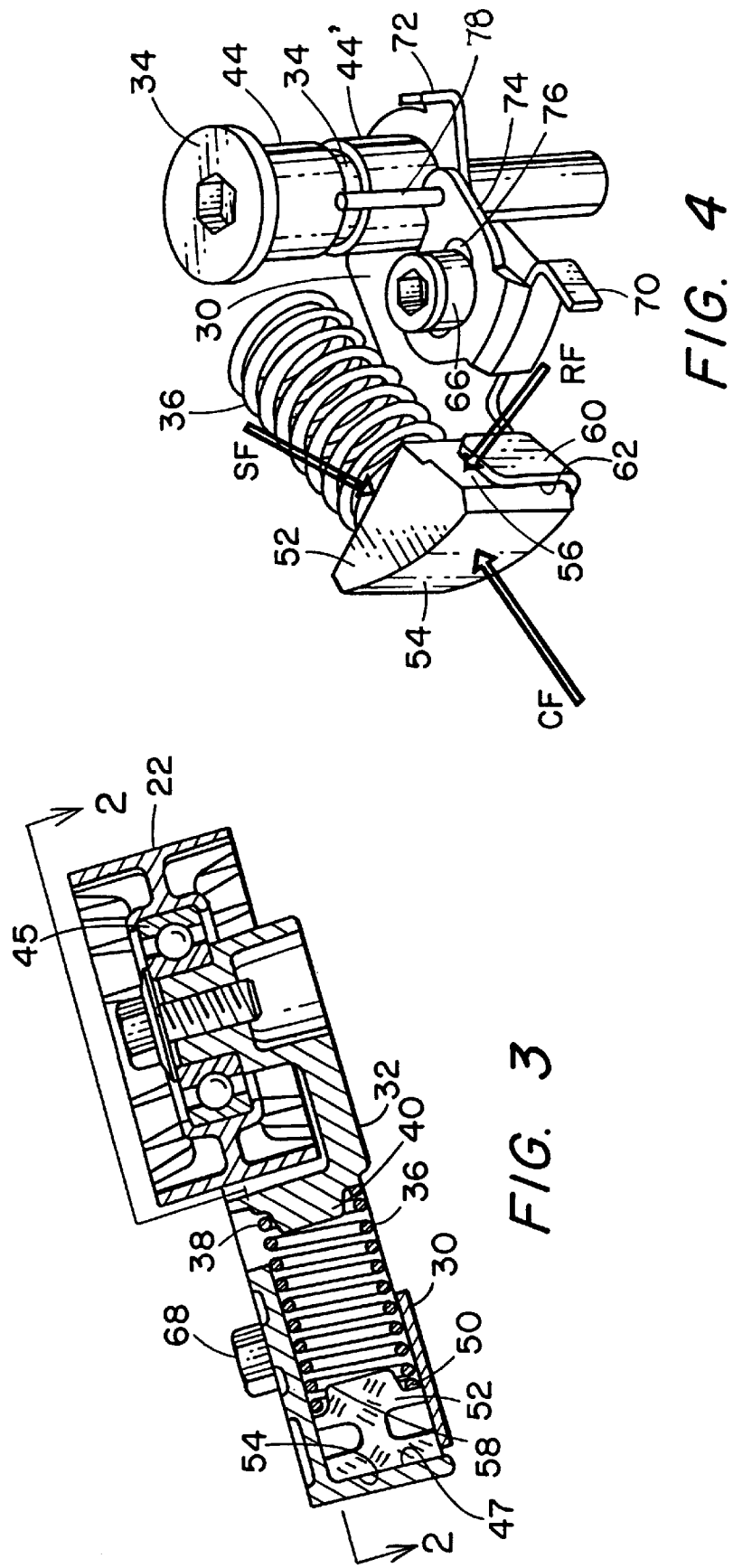

TENSIONER WITH DAMPING SHOE ACTIVATED BY COMPRESSION SPRING

BACKGROUND OF THE INVENTION

The invention relates to a tensioner for tensioning a belt of a belt drive system, but more particularly, the invention relates to a damping mechanism for a spring type tensioner where the spring biases the position of a pivot-arm to which a pulley is attached. While the tensioner of the invention may be used in various applications for tensioning belts, it is particularly useful in controlling belt tension of a V-ribbed belt as associated with a front end accessory drive or a synchronous belt as associated with a camshaft belt drive system for automotive applications.

Automatic tensioners of the mechanical type have designs for accommodating a particular type of spring to bias a position of the tensioner's pivot-arm. Various types of springs are known to be used to accommodate a particular design and include belville springs, volute springs, compression springs, tension springs, or torsional springs. Each type of spring offers some advantages while also introducing some design limitations for a tensioner. Perhaps, the spring most used today in automotive tensioners is a coiled torsional spring. An advantage of using a torsional spring is that four forces are needed to define two couples for winding the spring and wherein at least one of the forces can be advantageously used or "tapped" to operate a damping mechanism that inhibits movement of the pivot-arm.

While springs with torsional type tensioners have some design advantages such as the option to use one of the spring winding forces to generate damping, they also have some limitations. For example, the amount of available damping is limited to a function of a radius at which friction surface sliding takes place to effect damping. Also, torsional spring type tensioners must be mounted with its pivot-arm angled in a geometric manner relative to an engaged belt so that a trigonometric shortening and lengthening of the pivot-arm compensates for variations introduced by the coiled torsional spring. An example of a tensioner with a torsional spring and a damping mechanism operative with friction surface sliding at a radius is shown in U.S. Pat. No. 5,632,697.

Some of the disadvantages of using a coiled torsional spring for a tensioner may be overcome with a tensioner designed to use a compression spring. A compression spring may be operatively connected between a base member and a pivot-arm in such a manner that it provides substantially a constant torque output as measured at a pivot-arm. Also, the radius or moment about which friction surface sliding takes place may be increased to effect a larger percentage of damping. Examples of tensioners with compression springs are disclosed in U.S. Pat. Nos. 5,098,347; 5,045,031; and 5,591,094. While such tensioners solve some of the problems associated with torsional springs such as by providing a constant torque output and a larger radius at which damping takes place with friction surface sliding, they also introduce their own disadvantages. One of the disadvantages is that only two forces are available for "tapping" with a compression spring as opposed to four forces being available for "tapping" with a torsional spring. Consequently, and with only two available forces, there is no force of a compression spring that is easily "tapped" to provide a force for a damping mechanism. More particularly, there is a problem of defining a force for damping that is additive to a hub load to effect a total force available for a damping mechanism. In other words, the prior art tensioners are unable to define a spring force for a damping mechanism in conjunction with a single compression spring that biases a position of a pivot-arm. The prior art solved the spring force problem for damping with the addition of a second spring such as a U-shaped leaf spring or a second compression spring where such springs provide a constant force which results in constant (as opposed to variable) damping of a pivot-arm.

This invention is directed to those tensioner designs that incorporate a compression spring to bias the position of a pivot-arm and to solving the prior art problem of the necessity of using a second spring to provide a force to a damping mechanism to effect damping by friction surface sliding.

SUMMARY OF THE INVENTION

In accordance with the invention, an automatic mechanical tensioner is provided that is useful to tension a belt of a belt drive system. The tensioner may be used in conjunction with a synchronous belt drive system or a V-ribbed front-end-accessory drive belt system, both of which are used in automotive applications.

The tensioner is of the type with a base, a pivot-arm that oscillates about a pivot secured to the base, a pulley attached to the pivot-arm and for engaging a belt, a compression spring with a first end operatively connected to the pivot-arm, and a damping mechanism that inhibits oscillatory movements of the pivot-arm.

In accordance with the invention, only a single compression spring is required. The spring is "hooked up" in such a way that the same spring force that is used to bias position of the pivot-arm, is also "tapped" and used as a force for the damping mechanism.

The pivot-arm includes an extension or portion with a concave arcuate surface that moves with the pivot-arm. A moveable shoe with a convex arcuate friction surface engages the concave arcuate surface. The compression spring is held in a position between the damping shoe and pivot-arm by way of a protuberance attached to the base. Forces acting on the shoe keeps it from moving in relation to the concave arcuate surface. Friction surface sliding takes place between the shoe and concave surface to effect damping.

An object of the invention is to use only one compression spring to provide both a biasing force to a pivot-arm and a contributory force to a damping mechanism.

An advantage of the invention is that a pulley attached to a pivot-arm receives a belt load and generates a spring force that adds to a force for the damping mechanism when the pulley moves in a direction that compresses the spring.

These and other objects or advantages of the invention will be apparent after reviewing the drawings and description thereof wherein:

FIG. 3 is a sectional view taken along the line 3—3 of FIG. 2; and

FIG. 4 is a perspective view showing an interrelationship of certain features of the invention.

DESCRIPTION OF PREFERRED EMBODIMENTS

Figure 1:
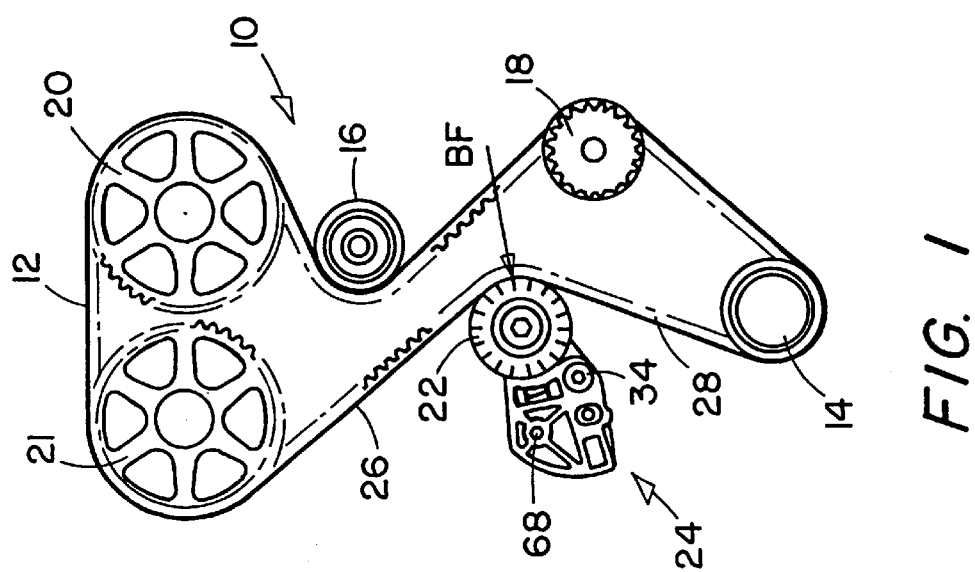
FIG. 1 is a front view schematic of a synchronous (timing) belt drive system of the automotive type which includes a tensioner of the invention.

Referring to FIG. 1 and for purpose of illustration without limitation to a particular belt drive system, a synchronous or "timing" belt drive system 10 includes a toothed belt 12 entrained and tensioned around a crank pulley 14, an idler pulley 16, and a water pump pulley 18, cam shaft pulleys 20, 21 and a tensioning pulley 22 of a tensioner 24 of the invention.

The tensioning pulley 22 engages the belt 12 and receives a belt load in the form of belt tension of adjacent belt spans 26, 28. The belt tension of the spans combine to generate a belt force component BF which oftentimes is referred to as "hub load." The belt force component BF occurs along a bisector of an angle formed between the belt spans 26, 28.

Figure 2:
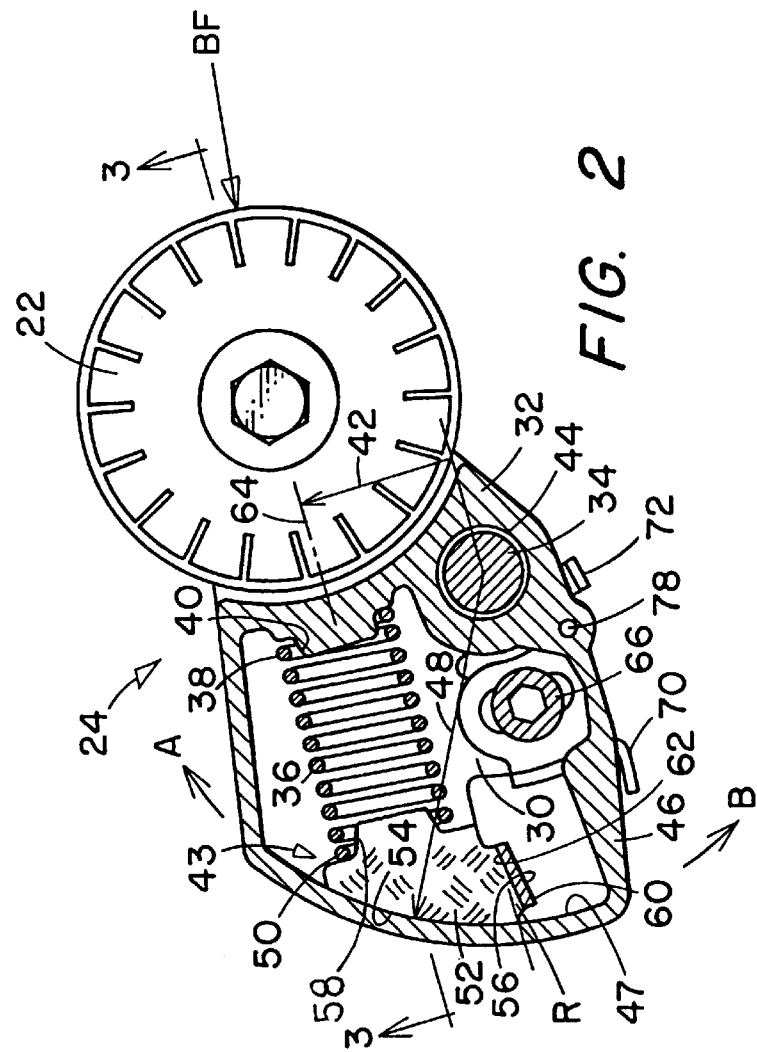
FIG. 2 is a sectional view taken along the line 2—2 of FIG. 3 and showing an enlarged tensioner of the invention.

Referring more particularly to FIGS. 2–4, the tensioner includes: a base 30; a pivot-arm 32 that oscillates about a pivot 34 that may be in the form of a fastener used to secure the tensioner to an engine (not shown); the pulley 22 attached to the pivot-arm and for engaging the belt 12 and receiving the belt force BF; a compression spring 36 with a first end 38 operatively connected to the pivot-arm 32 such as by a boss 40 located at an operative radius 42 in relation to the pivot; and a damping mechanism 43. Bushings 44, 44' are interpositioned between the pivot and pivot-arm in known fashion and the pulley is attached to the pivot-arm by way of a ball bearing 45, also in known fashion.

The pivot-arm 32 includes an extension 46 or portion in the form of a concave arcuate surface 47 that moves with the pivot-arm and is spaced a radial distance 48 from the pivot 34. The concave arcuate surface 47 is oriented to generally face the pivot 34 and a second end 50 of the compression spring 36.

The arcuate surface 47 is substantially concentric with the pivot and optionally, has a radial distance 48 that is equal to or greater than the operative radius 42 for greater damping (i.e. the larger the radius, the larger the damping torque for a given damping force).

The damping mechanism 43 includes a moveable shoe 52 with a convex arcuate friction surface 54 that is complimentary to and engages the concave arcuate surface 47 of the pivot-arm. The shoe may be in two-part form with a pad of friction material attached to and backed up by the shoe. The shoe has a ramp surface 56, and a spring receiving portion such as a boss 58. The spring receiving portion faces and attaches the second end 50 of the compression spring. The ramp surface 56 engages a protuberance 60 secured to or part of the base. The protuberance has a complimentary ramp surface 62 that engages the ramp surface 56 of the shoe. The ramp surface of the protuberance is oriented at a divergent angle R in relation to a longitudinal axis 64 of the spring.

The compression spring being biased between the pivot-arm and shoe, operates to press the convex surface 54 of the shoe against the concave surface 47 of the pivot-arm 32 to effect damping.

Referring more particularly to FIG. 4, the forces on the shoe 52 are balanced in such a manner to keep the shoe pressed against the ramp surface 62 when the arcuate surface oscillates in movement between a clockwise direction A and counterclockwise direction B. The ramp surface also operates to hold the second end of the spring in a substantially fixed position relative to the base by way of the boss 58.

The compression spring exerts a spring force SF on the shoe pressing the convex arcuate surface 54 against the concave arcuate surface 47 wedging the ramp surface 56 of the shoe against the ramp surface 62 of the protuberance 60. The concave surface 47 exerts a reactionary force CF against the shoe and the ramp surface 62 exerts a reactionary force RF against the shoe. The summation of these forces operate to position the shoe against the ramp surface 62 which is secured to or formed of the base by way of the protuberance 60.

For use, the tensioner 24 is located adjacent its installed position to an automotive engine and fasteners such as the pivot bolt 34 and another pin or bolt 66, attach and locate the tensioner in a fixed position on an engine (not shown). The toothed belt 12 is entrained around the crank pulley 14, idler pulley 16, water pump pulley 18, and cam pulleys 20, 21. A wrenching surface 68 is optionally provided as a means to rotate the tensioner with a wrench (in this case counterclockwise B) to a position away from the belt for easy belt installation. With the belt in the correct position, the pivot-arm is allowed to rotate (clockwise A) to where the pulley presses against the belt to its belt engaging position as shown in FIG. 1. The toothed belt 12 is tensioned as the pulley is positioned in pressing engagement against the belt. The base 30, which may be in the form of a second pivot-arm that moves around the pivot 34, is held in a fixed position relative to the engine by the fasteners 34, 66.

The pulley is pressed into engagement with the belt by means of the compression spring pushing on the pivot-arm at its operative radius 42 so as to rotate the pivot-arm which in this case, is clockwise A. The compression spring also presses against the moveable shoe 52 which is held in position relative to the base 30 by means of the engaged ramp surfaces 56, 62. The spring presses the convex arcuate surface 54 of the shoe against the concave arcuate surface 47 of the pivot-arm. The concave arcuate surface 47 angularly oscillates A-B in response to angular movements of the pivot-arm 32. The shoe 52 operates to damp angular movements of the pivot-arm by friction surface sliding between the concave arcuate surface 47 of the pivot-arm and convex arcuate surface 54 of the shoe. The balance of forces from engaged ramp surfaces 56, 62, engaged arcuates surface, and spring operate to keep the second end 50 of the spring in substantially a fixed position in relation to the base 30 so that the spring can operate to bias the pivot-arm and press the pulley against the belt.

Should the tension in the belt spans 26, 28, momentarily increase from an engine operating condition, the belt will press against the pulley with an increased force BF that operates to rotate the pivot-arm counterclockwise B and further compress the compression spring 36 resulting in an increased spring force SF. The increase in spring force operates to press against the damping shoe with increased force against the shoe and thereby increases friction surface sliding between the concave and convex arcuate surface 47, 54 which operate to inhibit the pivot-arm from moving in the counterclockwise direction B. Once the tension in the span decreases and the belt force BF decreases, the pulley is quickly pressed against the belt span by means of the compression spring 36 so as to maintain a belt tension.

Optionally, stops may be provided between the pivot-arm 32 and base 30 to limit the angular movement of the pivot-arm. The stops may be in the form of tabs 70, 72 that project from the base and into an arcuate path of the pivot-arm so as to engage the pivot-arm and restrict its movement.

Optionally, one of the tabs 70 may be adjustable relative to the base to permit the pivot-arm to rotate a predetermined angular amount in the counterclockwise direction. The tab 70 extends from a plate 74 with an arcuate slot 76. The plate is held in a fixed position relative to the base by means of a removable pin 78. Fastener 66 extends through the arcuate slot and is in a loosened condition when the tensioner is being installed so as to permit the plate to move relative to the base when the tensioner is being installed. When the tensioner is at its installed position with the pulley in pressing engagement against the belt, fastener 66 is tightened securing the plate to the base, and pin 78 is removed. The tab 70 is then set a predetermined distance from the pivot-arm.

The foregoing description is made for purpose of illustration only and is not intended to limit the scope of the invention which is to be determined by the appended claims.

What is claimed is:

1. A tensioner for tensioning a belt the tensioner having a base; a pivot-arm that oscillates about a pivot secured to the base; a pulley attached to the pivot-arm and for engaging the belt; a compression spring with a first and operatively connected to the pivot-arm at an operative radius in relation to the pivot; and a damping mechanism that inhibits oscillatory movements of the pivot-arm; and wherein the improvement comprises:

the pivot-arm including a concave arcuate surface that moves with the pivot-arm and is spaced a distance from the pivot, the concave arcuate surface oriented to generally face the pivot and a second end of the compression spring;

the damping mechanism including a moveable shoe with a convex arcuate friction surface complimentary to and engaging the concave arcuate surface of the pivot-arm, a spring receiving portion that faces and attaches to a second end of the spring, and a surface portion that engages a protuberance secured to the base, the spring applying a spring force against the shoe pressing the convex arcuate surface against the concave surface generating a reactionary force to the shoe, the spring force and reactionary force combining to press the shoe against the protuberance.

2. The tensioner as claimed in claim 1 wherein the surface portion of the damping shoe and the protuberance are in the form of complimentary ramp surfaces oriented in the direction of a divergent angle in relation to a longitudinal axis of the spring.

3. The tensioner as claimed in claim 1 where the concave arcuate surface of the pivot-arm is substantially concentric with the pivot.

4. The tensioner as claimed in claim 2 wherein the complimentary ramp surfaces form a divergent angle in relation to a longitudinal axis of the compression spring.

5. A tensioner with a base; a pivot-arm that oscillates about a pivot secured to the base; a pulley attached to the pivot-arm; a compression spring with a first end operatively connected to the pivot-arm; and a damping mechanism that inhibits oscillatory movements of the pivot-arm; and wherein the improvement comprises:

the pivot-arm including an extension with a concave arcuate surface that moves with the pivot-arm and is oriented to generally face the pivot and a second end of the compression spring;

the damping mechanism including a moveable shoe with a convex arcuate friction surface substantially complimentary to and engaging the concave arcuate surface of the pivot-arm, a spring receiving portion that faces and attaches to a second end of the spring, and the shoe stabilized to the base, the spring applying a spring force against the shoe and thereby pressing the convex arcuate surface of the shoe against the concave surface of the pivot-arm.

6. The tensioner as claimed in claim 5 wherein the shoe is stabilized to the base by a protuberance secured to the base and having a ramp surface that engages a complimentary ramp surface of the shoe.

* * * * *